Nov. 18, 1924.
P. A. SKELLY
1,516,315
STATION AND INFORMATION INDICATOR
Filed Jan. 31, 1924
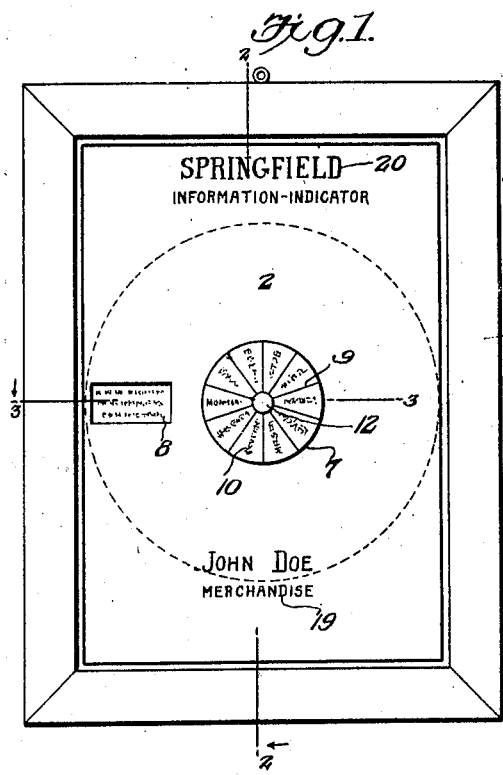
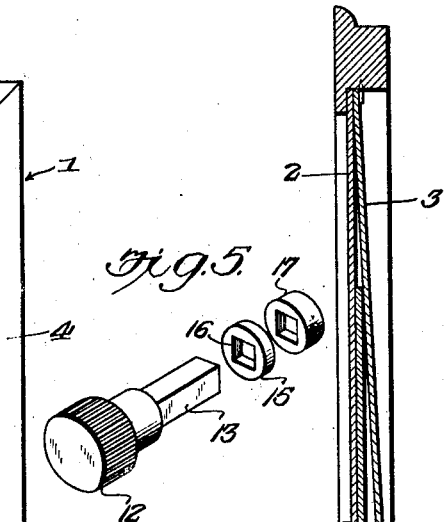
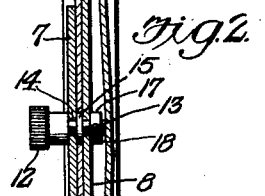
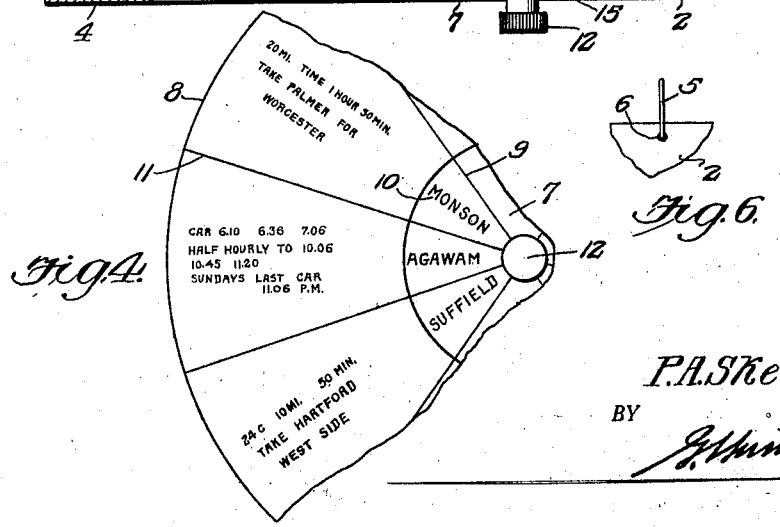
INVENTOR.
P. A. Skelly,
BY
ATTORNEY.

Patented Nov. 18, 1924.

1,516,315

UNITED STATES PATENT OFFICE.

PETER A. SKELLY, OF SPRINGFIELD, MASSACHUSETTS.

STATION AND INFORMATION INDICATOR.

Application filed January 31, 1924. Serial No. 689,722.

*To all whom it may concern:*

Be it known that PETER A. SKELLY, a citizen of the United States of America, residing at Springfield, in the county of Hampden and State of Massachusetts, has invented new and useful Improvements in Station and Information Indicators, of which the following is a specification.

The present invention has for its purpose to provide, in a station and information indicator, a construction of device to be suspended in any suitable location, either in a station or on a sidewalk or in street or railway cars and buses, for giving the public information as to the location of towns, stations, changes, distances between places and the time to be consumed in traveling from one place to another.

Another purpose is to provide an indicator of this character including a framed chart with large and small disks upon opposite sides thereof, the latter having names of the places, the former having the necessary mileage between the places indicated on the small disk and the stations or other places indicated on the large disk, together with a full time table relative to these corresponding places or towns or stations, in conjunction with means for causing the larger disk to rotate with the smaller disk, so that the information on the larger disk will appear through a transparently covered opening in the chart.

Still another purpose is the provision of a chart having a space thereof for the reception of various advertisements, such as those of merchants and the like as well as professional industries.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 1 is a view in perspective of the improved station and information indicator constructed in accordance with the invention.

Figure 2 is a vertical sectional view through the same on line 2—2 of Figure 1.

Figure 3 is a transverse sectional view on line 3—3 of Figure 1.

Figure 4 is an enlarged detail view of a portion of the large disk at the rear of the chart, illustrating the character of some of the information to be indicated.

Figure 5 is a detail perspective view of the means for causing the two disks to rotate together.

Figure 6 is a detail view of the section 2 and the cord 5.

Referring to the drawings, 1 designates the station and information indicator as a whole which comprises a chart made of any suitable material, such as cardboard of any area and thickness. In fact, the chart includes front and back cardboard pieces or sections 2 and 3 fastened together for a short distance from their marginal edges, either by adhesive material or by clips. While the chart consisting of the front and back cardboard pieces or sections is shown as mounted in a frame 4, it is obvious that the frame may be dispensed with and the chart used separately. In this case, a small loop cord 5 passing through an eye 6 in the upper part of the chart may be used for suspending the chart or indicator on a wall.

However, before fastening the two sections or pieces together, front and rear disks 7 and 8 are disposed adjacent the front and rear surfaces of the section or piece 2 of the chart. The front disk is smaller than the rear disk and is marked with segmental divisions 9 on which the names 10 of various stations are printed. The front face of the rear disk which is of a diameter greater than the diameter of the front disk is marked with segmental spaces 11 which are supplied with printing indicating various towns or stations and the mileage from a town or station indicated in an opposite segment of the front disk to the various towns or stations on the rear disk as well as giving the time in which the runs can be made as well as the time of starting the trains or buses, also the changes. The indicia in the segmental spaces 11 is visible through a rectangular opening $8^a$ formed in the front disk 7.

In order that the information on the rear disk may appear opposite the respective segments on the small disk, the two disks are required to rotate together, and to accomplish this a suitable knob 12 is provided. This knob has a square stem 13 which passes through similar shaped openings 14 in the front and rear disks, there being a clinch washer 15 which has a square opening 16 to also receive the square stem of the knob. A collar 17 is fitted upon the rear end of the knob and secured thereon by means of a set-screw 18 to not only keep the disks in their relative positions in engagement with the stem but to cause the two disks and the knob to rotate together as well as prevent disconnection of the knob.

After the disks have been so connected and mounted upon the front piece or section of cardboard, the rear section of cardboard is fastened to the front cardboard adhesively and the chart is then ready to be suspended on the wall or any other suitable location, either with or without a frame.

The front cardboard or section has a relatively large area of space surrounding the small disk and is adapted to have printed thereon various advertisements 19 as indicated, such as that of merchants, professional men and the like. The top of this space has printed thereon the name 20 of the town or station wherein the particular chart or indicator is used, so that those in such town may procure the desired information.

The invention having been set forth, what is claimed is:

1. A station and information indicator comprising front and rear sections including a compartment therebetween, front and rear disks, the front disk having names of various stations and towns, the rear disk having segments of information opposite those on the front disk and pertaining thereto, the front section having an opening, and means for rotating the two disks whereby the information on the rear disk may appear through the opening.

2. A station and information indicator comprising front and rear walls including a compartment therebetween, the front wall having an opening, front and rear disks, one mounted adjacent the front face of the front wall, the other operable in the compartment, the rear disk having segmental spaces with information thereon pertaining to names of towns and stations on the front disk, means for connecting the two disks, whereby the rotation of one rotates the other to cause the information on the rear disk to appear through the opening, and a device for manually rotating the front disk.

3. A station and information indicator comprising front and rear walls including a compartment therebetween, the front wall having an opening, front and rear disks, one mounted adjacent the front face of the front wall, the other operable in the compartment, the rear disk having segmental spaces with information thereon pertaining to names of towns and stations on the front disk, means for connecting the two disks, whereby the rotation of one rotates the other to cause the information on the rear disk to appear through the opening, a device for manually rotating the front disk, said means comprising a stem angular in cross sectional area, the front and rear disks having similarly shaped openings to receive the stem which forms a part of the rotating device, and means on the stem to prevent detachment thereof from the disks.

4. A station and information indicator comprising front and rear walls including a compartment therebetween, the front wall having an opening, front and rear disks, one mounted adjacent the front face of the front wall, the other operable in the compartment, the rear disk having segmental spaces with information thereon pertaining to names of towns and stations on the front disk, means for connecting the two disks, whereby the rotation of one rotates the other to cause the information on the rear disk to appear through the opening, a device for manually rotating the front disk, said means comprising a stem angular in cross sectional area, the front and rear disks having similarly shaped openings to receive the stem which forms a part of the rotating device, means on the stem to prevent detachment thereof from the disks, the front wall having an area of space surrounding the front disk for containing advertisements, and means for suspending the indicator from a stationary support.

In testimony whereof he affixes his signature.

PETER A. SKELLY.